(12) United States Patent
Cakmak et al.

(10) Patent No.: US 10,535,001 B2
(45) Date of Patent: Jan. 14, 2020

(54) REDUCING PROBLEM COMPLEXITY WHEN ANALYZING 3-D IMAGES

(71) Applicant: International Business Machines Corporation, Armonk, NY (US)

(72) Inventors: Umit Cakmak, Cracow (PL); Lukasz G. Cmielowski, Cracow (PL); Marek Oszajec, Debica (PL); Wojciech Sobala, Cracow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 96 days.

(21) Appl. No.: 15/804,551

(22) Filed: Nov. 6, 2017

(65) Prior Publication Data

US 2019/0138906 A1    May 9, 2019

(51) Int. Cl.
*G06N 3/08* (2006.01)
*G06N 3/04* (2006.01)
*G06T 7/00* (2017.01)

(52) U.S. Cl.
CPC ........... *G06N 3/088* (2013.01); *G06N 3/0481* (2013.01); *G06T 7/0012* (2013.01);
(Continued)

(58) Field of Classification Search
CPC . G06T 2207/20081; G06T 2207/20084; G06T 2207/10072; G06T 2207/10081; G06T 11/005; G06T 17/20; G06T 7/74; G06T 7/97; G06T 2207/10028; G06T 19/00; G06T 19/20; G06T 7/11; G06T 7/12; G06T 5/50; G06T 7/136; A61B 2576/00; A61B 5/08; A61B 5/7267; A61B 8/5223; A61B 5/05; A61B 5/7221; A61B 7/267; G06K 9/00201; G06K 9/6256; G06K 9/66; G06K 9/6269; G06K 9/00248; G06K 9/00771; G06K 9/00288; G06K 9/00751; G06K 9/6282; G06K 2209/23;
(Continued)

(56) References Cited

U.S. PATENT DOCUMENTS

8,239,336 B2 *  8/2012  Le Roux .................. G06N 3/08
                                                            706/25
9,589,374 B1     3/2017  Gao et al.
(Continued)

*Primary Examiner* — Aklilu K Woldemariam
(74) *Attorney, Agent, or Firm* — Gates & Cooper LLP (57) ABSTRACT

A method for training a deep learning algorithm using N-dimensional data sets may be provided. Each data set comprises a plurality of N−1-dimensional data sets. The method comprises selecting a batch size and assembling an equally sized training batch. The samples are selected to be evenly distributed within said respective N-dimensional data sets. The method comprises also starting from a predetermined offset number, wherein the number of samples is equal to the selected batch size number, and feeding said training batches of N−1-dimensional samples into a deep learning algorithm for the training. Upon the training resulting in a learning rate that is below a predetermined level, selecting a different offset number for at least one of said N-dimensional data sets, and going back to the step of assembling. Upon the training resulting in a learning rate that is equal or higher than said predetermined level, the method stops.

15 Claims, 5 Drawing Sheets

(52) U.S. Cl.
CPC ........... *G06T 2207/10081* (2013.01); *G06T 2207/10088* (2013.01); *G06T 2207/10116* (2013.01); *G06T 2207/10132* (2013.01); *G06T 2207/30196* (2013.01)

(58) Field of Classification Search
CPC ........... G06K 9/3233; G06K 9/00281; G06K 9/00268; G06N 3/08; G06N 20/00; G06N 5/003; G06F 21/32; G06F 17/16; G06F 16/583; G06F 16/5838; G06F 16/955; G06F 16/285; G06F 21/566; G06F 15/82; H04L 63/0861; H04R 25/505; Y04S 10/54; G10L 25/27; G08B 13/19613; G16C 10/00; G01R 33/5608; G01R 31/31703; G01R 31/31708; H04N 5/332; B28B 17/0081; G05B 19/4099
USPC .......................................... 382/118, 128, 154
See application file for complete search history.

(56) References Cited

U.S. PATENT DOCUMENTS

| | | | | |
|---|---|---|---|---|
| 2011/0077484 | A1* | 3/2011 | Van Slyke | A61B 5/02416 600/324 |
| 2013/0012823 | A1* | 1/2013 | Ripoll | A61B 5/021 600/479 |
| 2013/0091081 | A1* | 4/2013 | He | G06N 20/00 706/12 |
| 2014/0355850 | A1* | 12/2014 | Kelm | G06T 7/0012 382/128 |
| 2015/0317511 | A1* | 11/2015 | Li | G06K 9/00288 382/118 |
| 2016/0019434 | A1* | 1/2016 | Caldwell | G06K 9/4671 345/474 |
| 2016/0019458 | A1* | 1/2016 | Kaufhold | G01S 7/417 342/25 F |
| 2016/0306876 | A1* | 10/2016 | Nichols | G06N 7/005 |
| 2016/0321776 | A1* | 11/2016 | Zou | G06T 1/20 |
| 2016/0321777 | A1* | 11/2016 | Jin | G06F 9/5016 |
| 2016/0350649 | A1* | 12/2016 | Zhang | G06N 3/0454 |
| 2017/0032222 | A1 | 2/2017 | Sharma et al. | |
| 2017/0046616 | A1 | 2/2017 | Socher et al. | |
| 2017/0116497 | A1* | 4/2017 | Georgescu | A61B 6/032 |
| 2017/0148156 | A1* | 5/2017 | Bregman-Amitai | G06T 7/0012 |
| 2017/0148433 | A1* | 5/2017 | Catanzaro | G10L 15/02 |
| 2017/0154258 | A1* | 6/2017 | Liu | G06N 3/0445 |
| 2017/0154413 | A1* | 6/2017 | Yu | G06K 9/6223 |
| 2017/0337687 | A1* | 11/2017 | Wang | G06T 7/11 |
| 2018/0082212 | A1* | 3/2018 | Faivishevsky | G06N 20/00 |
| 2018/0089553 | A1* | 3/2018 | Liu | G06N 3/006 |
| 2018/0095450 | A1* | 4/2018 | Lappas | B33Y 10/00 |
| 2018/0144214 | A1* | 5/2018 | Hsieh | G06K 9/6265 |
| 2018/0144466 | A1* | 5/2018 | Hsieh | G06F 19/00 |

* cited by examiner

REDUCING PROBLEM COMPLEXITY WHEN ANALYZING 3-D IMAGES

FIELD OF THE INVENTION

The invention relates generally to a method for training a deep learning algorithm, and more specifically, to a method for training a deep learning algorithm using N-dimensional data sets. The invention relates further to a related system for training a deep learning algorithm and a computer program product.

BACKGROUND

In today's world, machine learning is heavily applied for a large variety of knowledge fields. One focus area is disease prevention, medical diagnosis and treatment. Doctors may be supported by cognitive computing systems for faster and more reliable diagnoses. Machine learning algorithms, in particular database (DB) learning, show better accuracy than traditional methods of diagnosis. Data sets used in medical imaging are three-dimensional (3-D) data sets which consist of two-dimensional (2-D) films—also known as slices— such as computerized tomography scans. The data volume is typically relatively high due to the required high color—but also black and white—resolution.

These data sets may share many similarities with other 3-D data sets in terms of data representation. Deep learning algorithms are among the most proven algorithms, especially convolution neural networks (CNN). Such methods require patient data to be in a specified format; however, most of the patient's data is not compliant with that. The number of images for a patient is huge—in the range of about 200 slices—and the varying number of 3-D images per patient (training data) may cause deep learning algorithm adoption to be extremely hard and time-consuming.

SUMMARY

According to one aspect of the present invention, a method for training a deep learning algorithm using N-dimensional data sets may be provided. Each N-dimensional data set may comprise a plurality of N−1-dimensional data sets, also denoted as data slices or simply a slice. The method may comprise (a) selecting a batch size number, and (b) assembling an equally sized training batch for each N-dimensional data set. The training batch may comprise a number of N−1-dimensional samples from the N-dimensional data set, wherein the samples may be selected to be evenly distributed within the respective N-dimensional data set, starting from a predetermined offset number. The number of samples may be equal to the selected batch size number.

The method may further comprise (c) feeding the training batches of N−1-dimensional samples into a deep learning algorithm for a training, and (d) upon the training resulting in a learning rate that is below a predetermined level, selecting a different offset number for at least one of the N-dimensional data sets, and repeating the method from step (b) onwards using an actual version of a deep learning algorithm model with a new batch.

Additionally, the method may comprise stopping the training using the N-dimensional data sets, if the training results in a learning rate that is equal to or higher than the predetermined level.

According to another aspect of the present invention, a system for training a deep learning algorithm using N-dimensional data sets may be provided. Each N-dimensional data set may comprise a plurality of N−1-dimensional data sets. The system may comprise a selection unit adapted for selecting a batch size number, an assembling unit adapted for assembling an equally sized training batch for each N-dimensional data set. The training batch may comprise a number of N−1-dimensional samples from the N-dimensional data set, wherein the samples may be selected to be evenly distributed within the respective N-dimensional data set. The assembling unit may also be adapted for starting from a predetermined offset number. The number of samples may be equal to the selected batch size number.

The system may additionally comprise a supplying module adapted for feeding the training batches of N−1-dimensional samples into a deep learning algorithm for a training and a feedback module adapted for, upon the training resulting in a learning rate that is below a predetermined level, selecting a different offset number for at least one of the N-dimensional data sets, and returning process control back to the assembling unit using an actual version of a deep learning algorithm model with a new batch.

Last but not least, the system may comprise a termination detection module adapted for, upon the training resulting in a learning rate that is equal or higher than the predetermined level, stopping the training using the N-dimensional data sets.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Preferred embodiments of the invention will be described, by way of example only, and with reference to the following drawings.

DETAILED DESCRIPTION

In the context of this description, the following conventions, terms and/or expressions may be used:

The term 'deep learning'—in particular deep learning algorithm—(also known as deep structured learning or hierarchical learning) may denote a part of a broader family of machine learning methods based on learning data representations, as opposed to task-specific algorithms. The learning process may be supervised, partially supervised or unsupervised. Some representations may loosely be based on interpretation of information processing and communication patterns in a biological nervous system, such as neural coding that attempts to define a relationship between various stimuli and associated neuronal responses in the brain. Research attempts to create efficient systems to learn these representations from large-scale, unlabeled data sets. Deep learning architectures such as deep neural networks, deep belief networks and recurrent neural networks have been applied to fields including computer vision, speech recognition, natural language processing, audio recognition, social network filtering, machine translation and bioinformatics where they produced results comparable to and in some cases superior to human expert.

The term 'convolutional neural network' may denote a class of deep, feed-forward artificial neural networks that has successfully been applied to analyzing visual imagery. CNNs may use a variation of multilayer perceptrons designed to require minimal preprocessing. They are also known as shift invariant or space invariant artificial neural networks (SIANN), based on their shared-weights architecture and translation invariance characteristics.

Generally, convolutional networks were inspired by biological processes in which the connectivity pattern between neurons is inspired by the organization of the animal visual cortex. Individual cortical neurons respond to stimuli only in a restricted region of the visual field known as the receptive field. The receptive fields of different neurons partially overlap such that they cover the entire visual field.

Traditional CNNs use relatively little pre-processing compared to other image classification algorithms. This may mean that the network may learn the filters that, in traditional algorithms, may have been hand-engineered. This independence from prior knowledge and human effort in feature design is a major advantage. Typically, CNNs work with the same number of samples of data sets in each iteration step.

The term 'N-dimensional data set' may denote a group of data values organized in a N-dimensional matrix. Those data sets may be organized as a collection of N−1-dimensional data sets having an inherent logic. A pictorial example may be a 3-D data set composed of a stack of 2-D images. Thus, the 3-D data set may be organized in a 3-D matrix in an x-, y-, and z-direction. The 2-D images may be stacked on top of each other so that each layer in the 3-D data set may represent one image. However, also for a 4-D data set there may be an example: a series of 3-D volumetric data with an additional time axis. Thus, at each point in time one 3-D data set may have been captured.

The term 'learning rate' may denote a variable, related to the deep learning algorithm. The learning rate may be related to a change in the underlying training model from one iteration to a next iteration of the training process. If the training satisfies a predefined character, the training is terminated.

The term 'non-neighboring' regarding a selected data slice of the N-dimensional data set may denote not a direct neighbor of a data slice may be selected as an additional data slice. If every $10^{th}$ slice may have been picked originally, then slice 9 and 11—or 19 and 21—may not be chosen in a next iteration.

The term 'volumetric body visualization' may denote a class of visualization techniques typically used in medical applications like X-ray, MRI (magneto resonance imaging), MRT (magneto resonance tomography), inspections using ultrasonic waves, CT (computer tomography), and the like. Thus, the method may be used with virtually any N-dimension data set.

The term 'jump size' may denote a step length for selecting a next N−1-dimensional data slice from the N-dimensional data set. If one may start (offset) with data slice 5, then using a step count of 10, the additional data slices 15, 25, 35, etc., may be selected.

The proposed method for training a deep learning algorithm using N-dimensional data sets may offer multiple advantages and technical effects:

A significant reduction in time and effort for the training of a deep learning algorithm—in particular, those using convolutional neural networks—may be achieved. This may be based on the general concept that neighboring 2-D slices of 3-D volumetric image scans do not differ significantly. However, if only a subset of the 2-D slices can be used out of the varying number of available 2-D slices from a plurality of 3-D image scans, one may observe significant differences between neighboring 2-D slices in the subset. The selection of the 2-D slices may increase the probability of using 2-D slices differing significantly during the training. Because the machine learning algorithms may be trained easier and faster when recognizing these significant differences, the selected learning algorithm may converge faster, and a learning rate threshold may also be reached quicker. Additionally, by reducing the number of 2-D slices, the computational effort may also be reduced.

Overall, a much faster and almost equally reliable training result of the machine learning algorithm may be achieved if compared to performing the training always with a full set of 2-D slices of 3-D volumetric images.

It may also be noted that the general concept is not only limited to 3-D volumetric image scans and related 2-D slices. The general approach, and consequently the advantages, may also work for any N-dimensional data set being composed of N−1-dimensional sub data sets. Thus, a general method for reducing the training effort—and thus the time and computational effort required—of N-dimensional data sets may advantageously be made available.

In the following, additional embodiments of the method—also applicable for the related method—will be discussed.

According to one permissive embodiment of the method, N is 2, 3 or 4. However, the method may also work for higher numbers. An example for N=4 may be a series of 3-D data set taken at different points in time. Thus, the time would be the 4-th dimension.

According to one preferred embodiment of the method, the deep learning algorithm may is use a convolutional neural network (CNN). The CNN may be well suited for the here discussed kinds of problems, especially if the batch size stays constant or may be increased for all N–1-dimensional data sets at the same time.

According to one advantageous embodiment, the method may also comprise upon not stopping the training in step (e), adding non-neighboring randomly selected additional N–1-dimensional samples from each of the N-dimensional data sets to create an extended set of batches, and repeating the method from step (b) onwards using the actual version of a deep learning algorithm model with a new extended set of batches. Thus, a closed loop process may be established allowing the self-learning process to be executed with an again and again self-optimizing training model.

According to one additionally preferred embodiment, the method may also comprise upon the number of to be added non-neighboring randomly selected N–1-dimensional samples may be smaller than a predefined percentage threshold number, selecting all N–1-dimensional samples. Thus, the complete data set may be used in a way a non-optimized training may have been executed. Thus, the here proposed method may approach asymptotically the traditional of the deep learning training algorithm using always all available data.

According to one optional embodiment of the method, the N-dimensions data set may comprise data required for a volumetric body visualization. The mentioned body may be a biological body of a living animal or human. However, also other volumetric visualizations may be addressed by the proposed method, e.g., those of machines and engines, building geological formations and the like.

According to a permissive embodiment of the method, the volumetric body visualization may be a result of an analysis using one of the techniques selected out of the group comprising X-ray, ultrasonic, MRT, CT and Mill. Certainly, the data sets may also originate from other visualization purposes.

According to one additionally advantageous embodiment of the method, a jump size for selecting N–1-dimensional samples out of the N-dimensional data set may be determined by $i=\text{int}((k+m-1)/(s-1))$, wherein k=a smallest number of N–1-dimensional samples available in any of the N-dimensional data sets,
m=number of additional N–1-dimensional samples available in a specific N-dimensional data set, and
s=number of selected –1-dimensional samples from any of the N-dimensional data sets.

This way, always the same number of N–1-dimensional data sets—data set slices—may be selected which the traditionally known positive effect on the CNN.

According to a further preferred embodiment, the method may use an in-memory computing system for executing the method. Thus, all data and algorithm components may be held in the main memory of the computing system, resulting in an even faster development of an appropriate model from the training.

In the following, a detailed description of the figures will be given. All instructions in the figures are schematic. Firstly, a block diagram of an embodiment of the inventive method for training a deep learning algorithm using N-dimensional data sets is given. Afterwards, further embodiments, as well as embodiments of the system for training a deep learning algorithm using N-dimensional data sets, will be described.

Figure 1:
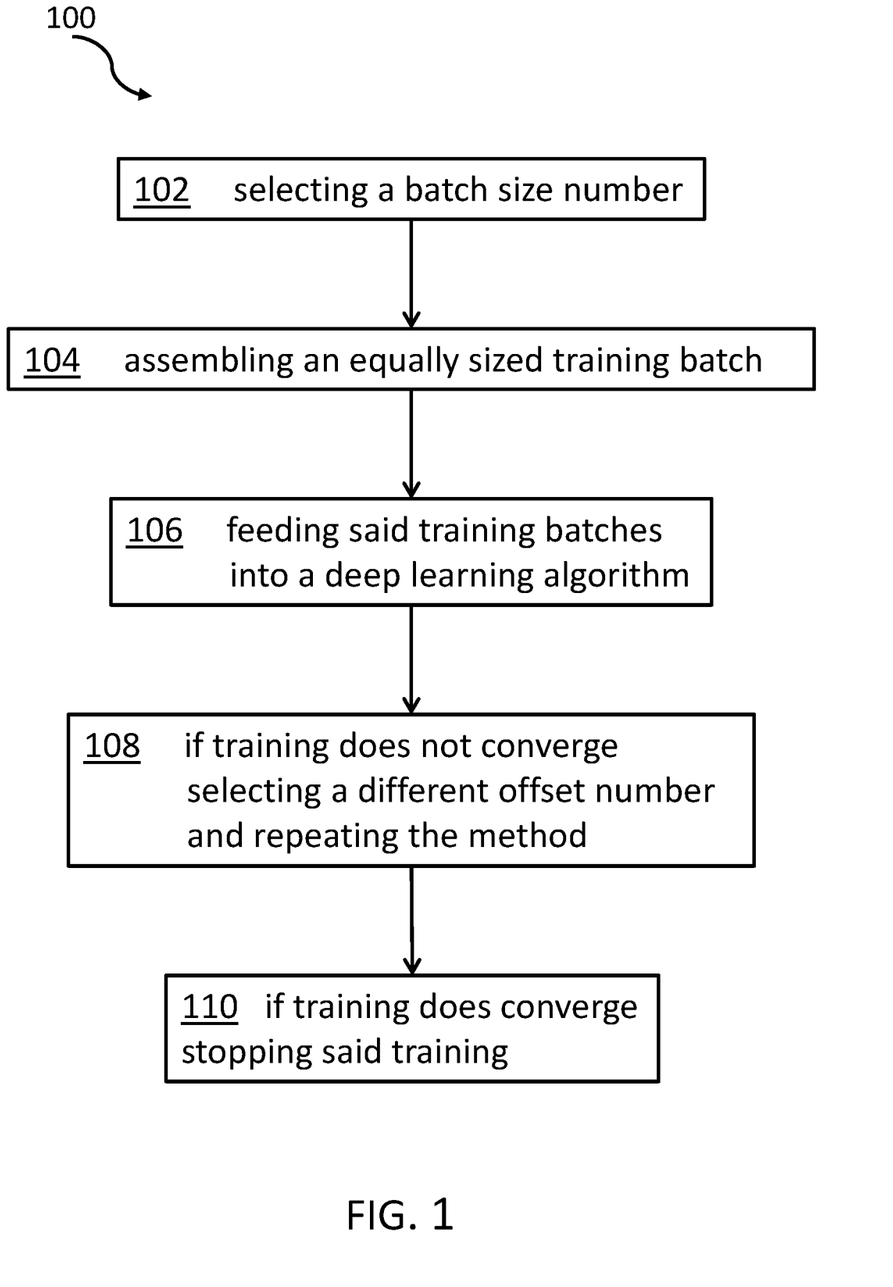
FIG. 1 shows a block diagram of an embodiment of the inventive method for training a deep learning algorithm using N-dimensional data sets.

FIG. 1 shows a block diagram of an embodiment of the inventive method 100 for training a deep learning algorithm using N-dimensional data sets. Each N-dimensional data set may comprise a plurality of N–1-dimensional data sets, i.e., slices. The method 100 may comprise (a) selecting, 102, a batch size number, and (b) assembling, 104, an equally sized training batch for each N-dimensional data set. The training batch comprising a number of N–1-dimensional samples from the N-dimensional data set. The samples are selected to be evenly distributed within the respective N-dimensional data set, starting from a predetermined offset number. The number of samples is equal to the selected batch size number, i.e., all training batches have the same number of slices.

The method 100 also comprises (c) feeding, 106, the training batches of N–1-dimensional samples into a deep learning algorithm—in particular a CNN—for a training.

If the training results in a learning rate that is below a predetermined level, the method 100 comprises selecting, 108, a different offset number for at least one of the N-dimensional data sets, and repeating the method 100 from step (b) onwards using an actual version of a deep learning algorithm model with a new batch.

If, however, it is determined, 110, that the training results in a learning rate that is equal or higher than the predetermined level, the method comprises stopping, 112, the training using the N-dimensional data sets. The model for the CNN is ready to be used.

Figure 2:
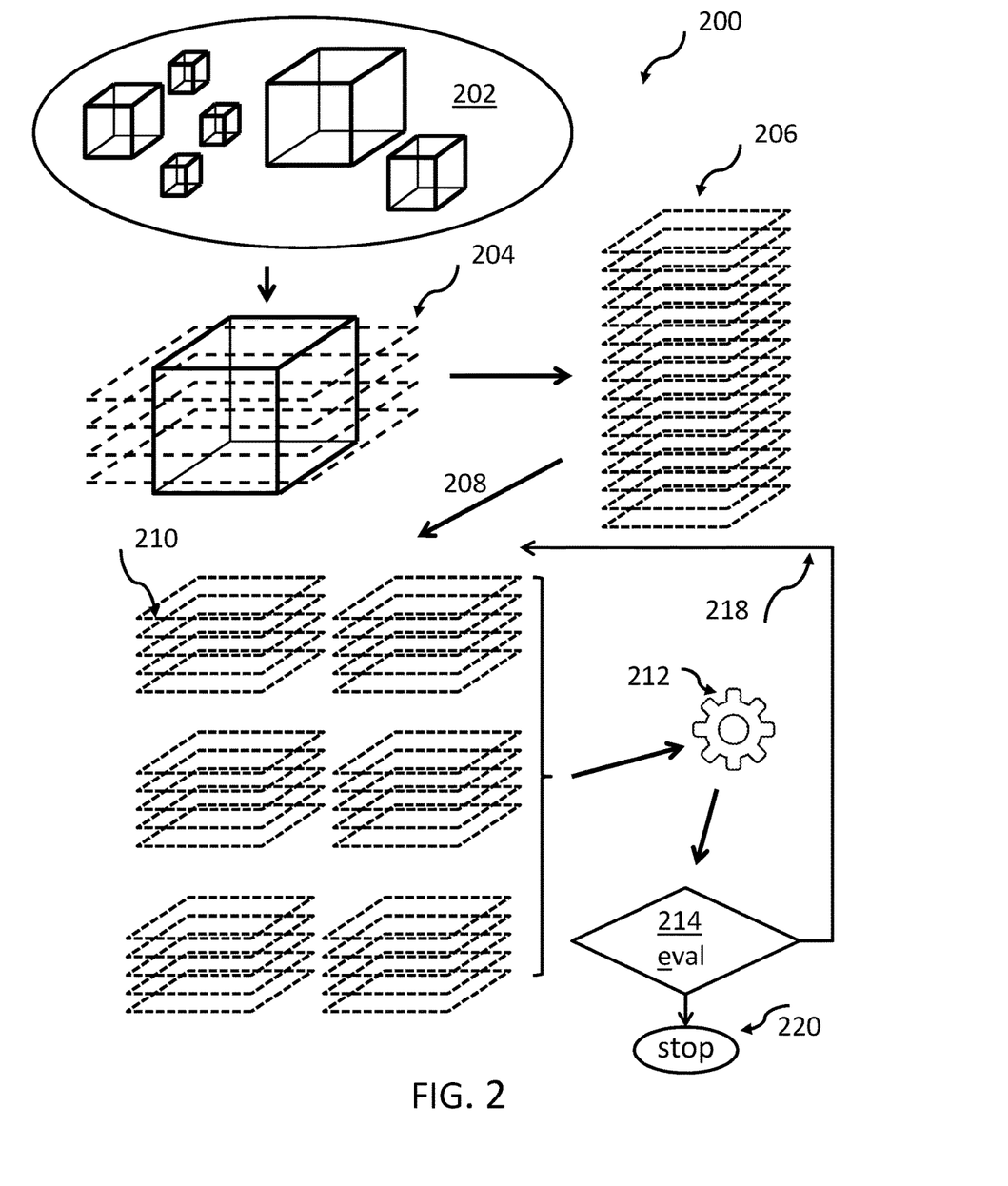
FIG. 2 shows a pictographic flow of how data sets may pass through an algorithm based on the proposed method.

FIG. 2 shows a pictographic flow 200 of how data sets may pass through an algorithm based on the proposed method. In this example, 3-D data sets 202 are used as data sources. The size of each cube may indicate that the 3-D data sets 202 may have different data density and thus may comprise different data volumes. One of the 3-D data sets is shown with an exemplary plurality of 2-D images, i.e., 2-D slices 204. It may be noted that the number of 2-D images may vary from 3-D data cube to 3-D data cube.

It may also be noted that for simplicity reasons only 3-D data sets with 2-D images are used. However, the proposed techniques are also applicable to any N-dimension data set comprising N–1-dimensional data sets, i.e., N–1-dimensional sub data sets or slices. The term slices may also be used for non-2-D sub data sets.

Consequently, a stack 206—i.e., plurality of 2-D data sets—is extracted from the 3-D data cube 202. In a next step—shown as arrow 208—the stack 206 of 2-D data sets is split into buckets of batches by selecting every i-th 2-D data set out of the complete stack 206 of 2-D data sets, resulting in a plurality of batches of 2-D data sets, i.e., slices, wherein each of the batches of 2-D data sets has a much lower number of 2-D data sets than the original stack 206 of 2-D data sets. It may be noted, that the number of 2-D data sets in each of the batches may be identical due to the requirement of the used convolutional neural networks Starting with one of the batches 210 of 2-D data sets, the training 212 of a model of the deep learning algorithm is performed. If the model is not converging using one of the batches 210 of the 2-D data sets, a next batch 210 is selected and the training of the model is continued. As soon as the model of the deep learning algorithm converges—in particular if a learning rate reaches or exceeds a predetermined level—the training can be stopped, 220, even if not all of the 2-D data sets of the stack 206 of 2-D data sets have been used for the training. This determination may be performed in the evaluation step 214. The refinement of the model of the deep learning algorithm by selecting another batch 210 of 2-D data sets may be symbolized by the arrow 218. This may help to reduce the computational effort and the required time to develop the model for the deep learning algorithm.

In the following, a more concrete example will be described:

Let's assume that the data set consists of n 3-D images. A 3-D image consists of 1, . . . k+m 2-D images (where m>=0). m indicates that each 3-D image/data set may contain different number of 2-D ones. k is the minimum number of slices/2-D images across all 3-D ones.

Figure 3A:
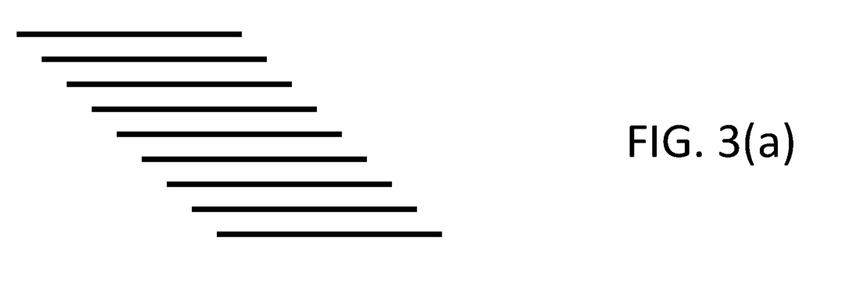
FIGS. 3(a), 3(b), 3(c) show sample graphics of a symbolization initial data sets with 3 3-D images (n=3) decomposed in to a set of 2-D images.
Figure 3B:
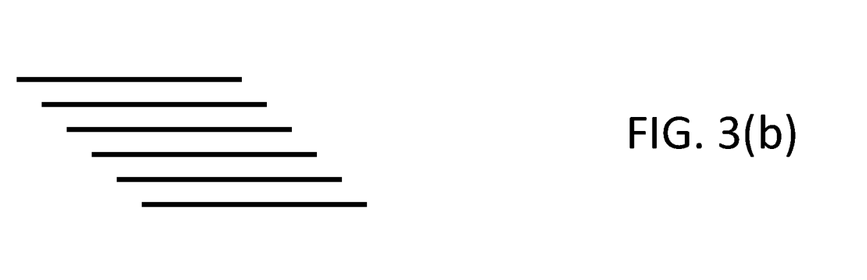
Figure 3C:
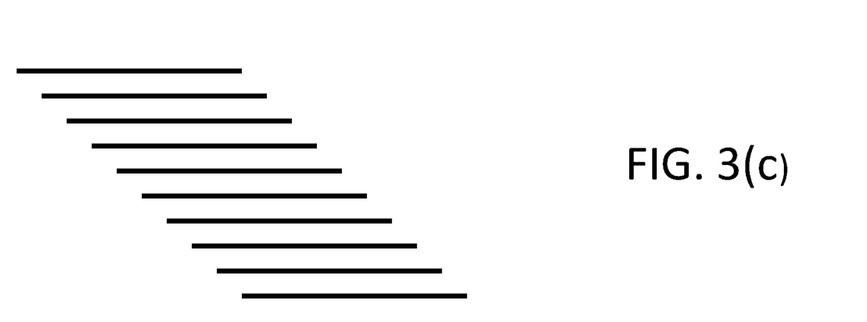

FIGS. 3(a), 3(b), 3(c) show sample data slices of a symbolized initial data set with three 3-D images (n=3) decomposed into sets of 2-D images:
A in FIG. 3(a) contains 6+3=9 2-D images (k=6, m=3),
B in FIG. 3(b) contains 6 2-D images (k=6, m=0), and
C in FIG. 3(c) contains 6+4=10 2-D images (k=6, m=4).

The method comprises—in more detail—the following steps:

Firstly, non-neighbor images/slices are selected. The following assumption may be made:
q is the number of 2-D image/slice from which a selection (as default we can use 0) is started.
s is the desired number of selected slices in a first round—the value should be definitely smaller than the minimum number of 2-D images/slices (k).

The jump size i defines how many slices will be skipped in that selection tour. For example: q=0, i=3 slices/images with following indexes will be selected: 0, 3, 6, 9, . . . .

It may be noted that the value of i depends on the number of 2-D images/slices among 3-D. It needs to be adjusted to return the same number of selected slices/images independently of the total number of 2-D images. In other words, the higher the value of 2-D images/slices is, the higher is the value of the jump size i.

The value of the jump size i can be calculated according to the following formula:

$$i=\text{int}((k+m-1)/s-1)$$

The term "int" means that the value in brackets is rounded to an integer number.

For each original 3-D image, an equal number of slices across all 3-D images is selected.

It may be assumed that the desired number of selected slices/2-D images is 3 (s=3). Then, the i value for each 3-D image in the here used example is:
A contains 9 2-D images (k=6, m=3, i=4)
B contains 6 2-D images (k=6, m=0, i=3)
C contains 10 2-D images (k=6, m=4, i=4), after applying the int cast.

Having i calculated, the desired slices are selected:
A: slices indexes [0, 4, 8],
B: slices indexes [0, 2, 4], and
C: slices indexes [0, 4, 8].

After this operation, there are n*s 2-D images selected. In our example, we will have 3*3=9 images.

Secondly, a series of train batches based on n*s images selected in previous steps is created. Depending on selected images number n*s one may create p batches, each of the batch containing (n*s) 2-D images.

In the here used simplified example, each batch will comprise three slices/2-D images.

Thirdly, the training, on already in a previous point created p batches is executed. If the training is done on p batches and the learning rate (e.g., accuracy) is at a satisfactory level—i.e., the predefined level—the system executing the proposed method 100 finalizes training on those batches series.

If the learning rate is NOT satisfactory, then new training batches are generated by selecting slices/2-D images, according to the following formula:

Move already selected indexes of slices/2-D images to a separate set (here denoted as already_used).

For remaining indexes, non-neighbour images/slices selection is related. If the number of remaining 2-D images/slices is smaller than required, additional images from an already_used data set are selected randomly. If the number is equal to a desired number of 2-D images, all data slides are selected.

Assumed that, in the actual example, the learning rate is not satisfactory for training, more batches are required. In that case, another set of 2-D images is selected according to the above formula:
already_used=[0, 4, 8
0, 2, 4
0, 4, 8].
The remaining data slices are=[1, 2, 3, 5, 6, 7
1, 3, 5
1, 2, 3, 5, 6, 7, 9]
Then
A contains 6 2-D images (k=4, m=2, i=2),
B contains 4 2-D images (k=4, m=0, i=1), and
C contains 7 2-D images (k=4, m=3, i=3).

Having i calculated, the desired slices are selected as follows:
A: slices indexes [1, 3, 6]
B: slices indexes [1, 3, 5], and
C: slices indexes [1, 5, 9].

Then, the process step of creating a series of training batches restarts and the training continues with the new 2-D images subset. The training is continued with new series of new batches and repeated again if needed, i.e., the learning rate is not sufficient.

Figure 4:
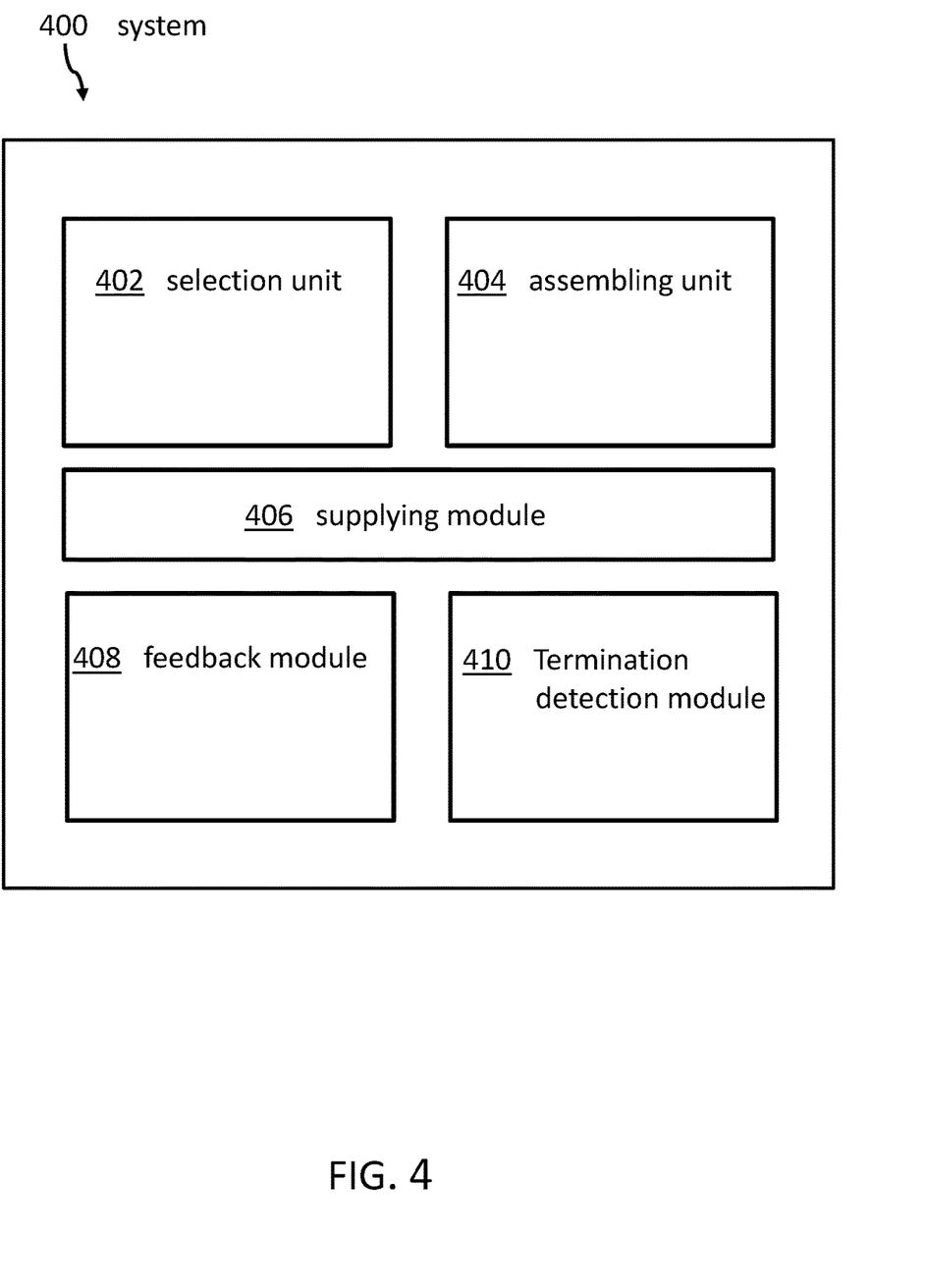
FIG. 4 shows a block diagram of an embodiment of the system for training a deep learning algorithm using N-dimensional data sets.

FIG. 4 shows a block diagram of an embodiment of the system 400 for training a deep learning algorithm using N-dimensional data sets. Again, each N-dimensional data set comprises a plurality of N−1-dimensional data sets. The system 400 comprises a selection unit 402 adapted for selecting a batch size number and an assembling unit 404 adapted for assembling an equally sized training batch for each N-dimensional data set. The training batch comprises a number of N−1-dimensional samples from the N-dimensional data set, wherein the samples are selected to be evenly distributed within the respective N-dimensional data set, starting from a predetermined offset number. The number of samples is equal to the selected batch size number.

The system 400 also comprises a supplying module 406 adapted for feeding the training batches of N−1-dimensional samples into a deep learning algorithm for a training and a feedback module 408 adapted for, upon the training resulting in a learning rate that is below a predetermined level, selecting a different offset number for at least one of the N-dimensional data sets, and returning process control back to the assembling unit using an actual version of a deep learning algorithm model with a new batch.

Furthermore, the system 400 comprises a termination detection 410 module adapted for, upon the training resulting in a learning rate that is equal or higher than the predetermined level, stopping the training using the N-dimensional data sets.

Figure 5:
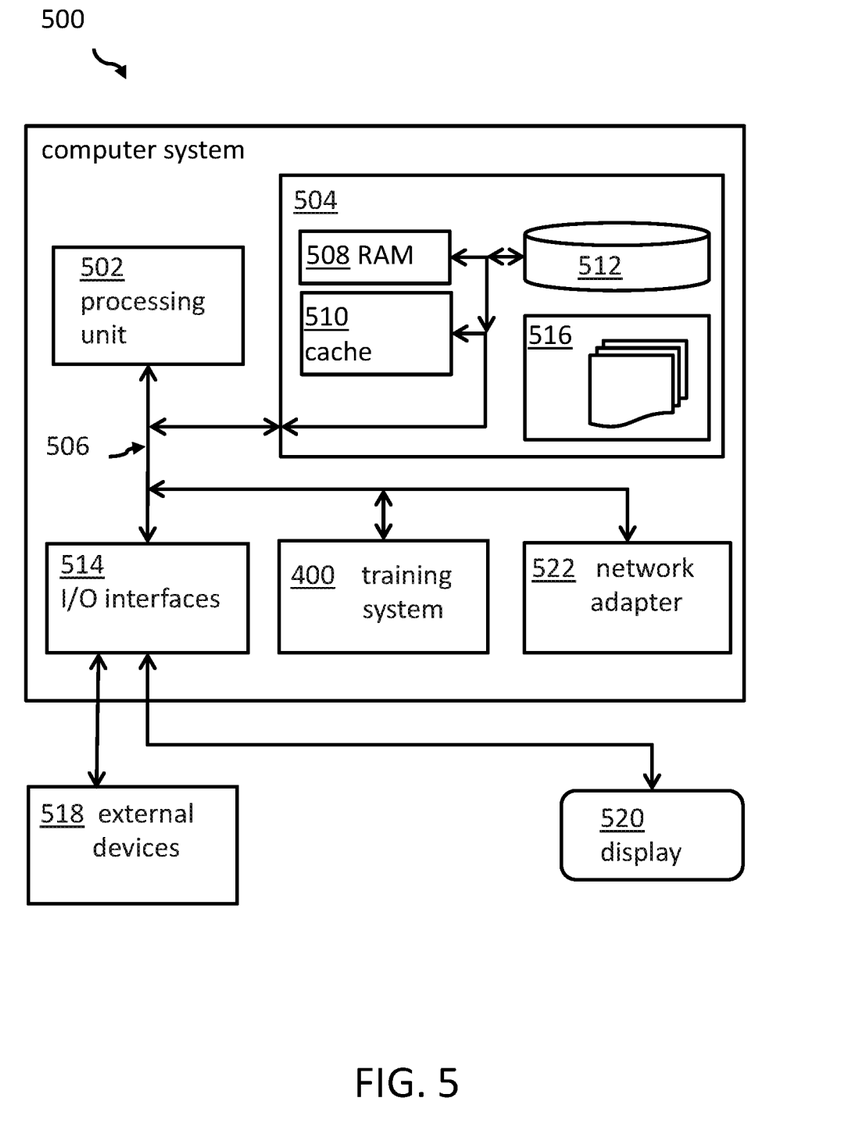
FIG. 5 shows a block diagram of a computing system comprising the system for training the deep background learning algorithm.

Embodiments of the invention may be implemented together with virtually any type of computer, regardless of the platform being suitable for storing and/or executing program code. FIG. 5 shows, as an example, a computing system 500 suitable for executing program code related to the proposed method.

The computing system 500 is only one example of a suitable computer system and is not intended to suggest any limitation as to the scope of use or functionality of embodiments of the invention described herein. Regardless, computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couples various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

The program/utility, having a set (at least one) of program modules 516, may be stored in memory 504 by way of example, and not limitation, as well as an operating system, one or more application programs, other program modules, and program data. Each of the operating system, one or more application programs, other program modules, and program data or some combination thereof, may include an implementation of a networking environment. Program modules 516 generally carry out the functions and/or methodologies of embodiments of the invention as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the system for training a deep learning algorithm using N-dimensional data sets may be attached to the bus system 506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for training a deep learning algorithm using one or more N-dimensional data sets, wherein N is 2, 3 or 4, each of said N-dimensional data sets comprising a number of N−1-dimensional sub data sets, said method comprising:
    a) selecting a batch size number;
    b) assembling one or more equally sized training batches for each of said N-dimensional data sets, each of said training batches comprising a number of N−1-dimensional samples from said N-dimensional data sets, wherein said N−1-dimensional samples are selected out of said N-dimensional data sets using a jump size in order to be evenly distributed within their respective said N-dimensional data sets, starting from a predetermined offset number, wherein said number of N−1-dimensional samples is equal to said selected batch size number and is lower than said number of N−1-dimensional sub data sets, and wherein the jump size for selecting N−1-dimensional samples out of said N-dimensional data sets is determined by:

$i = \text{int}((k+m-1)/(s-1))$, wherein:

k=a smallest number of N−1-dimensional samples available in any of said N-dimensional data sets,
    m=number of additional N−1-dimensional samples available in a specific one of said N-dimensional data sets, and
    s=number of selected N−1-dimensional samples from any of said N-dimensional data sets;
    c) feeding said training batches of said number of N−1-dimensional samples into a deep learning algorithm for a training;
    d) upon said training resulting in a learning rate that is below a predetermined level, selecting a different offset number for at least one of said N-dimensional data sets, and repeating said method from step b) onwards using an actual version of a deep learning algorithm model with one or more new ones of said training batches; and
    e) upon said training resulting in a learning rate that is equal or higher than said predetermined level, stopping said training using said N-dimensional data sets.

2. The method according to claim 1, wherein said deep learning algorithm is using a convolutional neural network.

3. The method according to claim 1, also comprising:
    upon not stopping said training in step e), adding non-neighboring randomly selected additional N−1-dimensional samples from each of said N-dimensional data sets to create an extended set of training batches; and
    repeating said method from step b) onwards using said actual version of a deep learning algorithm model with a new extended set of training batches.

4. The method according to claim 3, also comprising:
    upon said number of to be added non-neighboring randomly selected N−1-dimensional samples is smaller than a predefined percentage threshold number, selecting all N−1-dimensional samples.

5. The method according to claim 1, wherein said N-dimensions data sets comprise data required for a volumetric body visualization.

6. The method according to claim 5, wherein said volumetric body visualization is a result of an analysis using one of said techniques selected out of said group comprising X-ray, ultrasonic, MRT, CT and MRI.

7. The method according to claim 1, using an in-memory computing system for executing said method.

8. A system for training a deep learning algorithm using one or more N-dimensional data sets, wherein N is 2, 3 or 4, each of said N-dimensional data sets comprising a number of N−1-dimensional sub data sets, said system comprising:
    a selection unit adapted for selecting a batch size number;
    an assembling unit adapted for assembling one or more equally sized training batches for each of said N-dimensional data sets, each of said training batches comprising a number of N−1-dimensional samples from said N-dimensional data sets, wherein said N−1-dimensional samples are selected out of said N-dimensional data sets using a jump size in order to be evenly distributed within their respective said N-dimensional data sets, starting from a predetermined offset number, wherein said number of N−1-dimensional samples is equal to said selected batch size number and is lower than said number of N−1-dimensional sub data sets, and wherein the jump size for selecting N−1-dimensional samples out of said N-dimensional data sets is determined by:

$i = \text{int}((k+m-1)/(s-1))$, wherein:

k=a smallest number of N−1-dimensional samples available in any of said N-dimensional data sets,
    m=number of additional N−1-dimensional samples available in a specific one of said N-dimensional data sets, and
    s=number of selected N−1-dimensional samples from any of said N-dimensional data sets;
    a supplying module adapted for feeding said training batches of said number of N−1-dimensional samples into a deep learning algorithm for a training;
    a feedback module adapted for, upon said training resulting in a learning rate that is below a predetermined level, selecting a different offset number for at least one of said N-dimensional data sets, and returning process control back to said assembling unit using an actual version of a deep learning algorithm model with one or more new ones of said training batches; and
    a termination detection module adapted for, upon said training resulting in a learning rate that is equal or higher than said predetermined level, stopping said training using said N-dimensional data sets.

9. The system according to claim 8, wherein said deep learning algorithm is adapted to use a convolutional neural network.

10. The system according to claim 8, wherein said feedback module is also adapted for
    returning process control back to said assembling module, and wherein said assembling unit is also adapted for, upon not stopping said training by said termination detection module, adding non-neighboring randomly selected additional N−1-dimensional samples from each of said N-dimensional data sets to create an extended set of training batches, and using said actual version of a deep learning algorithm model with a new extended set of training batches.

11. The system according to claim 10, wherein said assembling unit is also adapted for
upon said number of to be added non-neighboring randomly selected N−1-dimensional samples is smaller than a predefined percentage threshold number, selecting all N−1-dimensional samples.

12. The system according to claim 8, wherein said N-dimensions data sets comprise data required for a volumetric body visualization.

13. The system according to claim 12, wherein said volumetric body visualization is a result of an analysis using one of said techniques selected out of said group comprising X-ray, ultrasonic, MRT, CT and MRI.

14. The system according to claim 8, comprising an in-memory computing system adapted for keeping all data required for said training a deep learning algorithm in main memory.

15. A computer program product for training a deep learning algorithm using one or more N-dimensional data sets, each of said N-dimensional data sets comprising a number of N−1-dimensional sub data sets, said computer program product comprising a computer readable storage medium having program instructions tangibly embodied therewith, said program instructions being executed by one or more computers to cause said one or more computers to:
a) select a batch size number;
b) assemble one or more equally sized training batches for each of said N-dimensional data sets, each of said training batches comprising a number of N−1-dimensional samples from said N-dimensional data sets, wherein said N−1-dimensional samples are selected out of said N-dimensional data sets using a jump size in order to be evenly distributed within their respective said N-dimensional data sets, starting from a predetermined offset number, wherein said number of N−1-dimensional samples is equal to said selected batch size number and lower than said number of N−1-dimensional sub data sets, and wherein the jump size for selecting N−1-dimensional samples out of said N-dimensional data sets is determined by:

$i=\text{int}((k+m-1)/(s-1))$, wherein:

k=a smallest number of N−1-dimensional samples available in any of said N-dimensional data sets,
m=number of additional N−1-dimensional samples available in a specific one of said N-dimensional data sets, and
s=number of selected N−1-dimensional samples from any of said N-dimensional data sets;

c) feed said training batches of said number of N−1-dimensional samples into a deep learning algorithm for a training;
d) upon said training resulting in a learning rate that is below a predetermined level, select a different offset number for at least one of said N-dimensional data sets, and repeating said method from step b) onwards using an actual version of a deep learning algorithm model with one or more new ones of said training batches; and
e) upon said training resulting in a learning rate that is equal or higher than said predetermined level, stop said training using said N-dimensional data sets.

* * * * *